Figure 4:
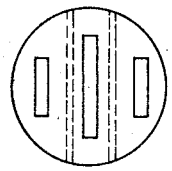

June 27, 1933.  G. HEYMER  1,915,418
PROCESS FOR PRINTING COPIES FROM A LENTICULAR FILM
Filed April 22, 1930   2 Sheets-Sheet 1
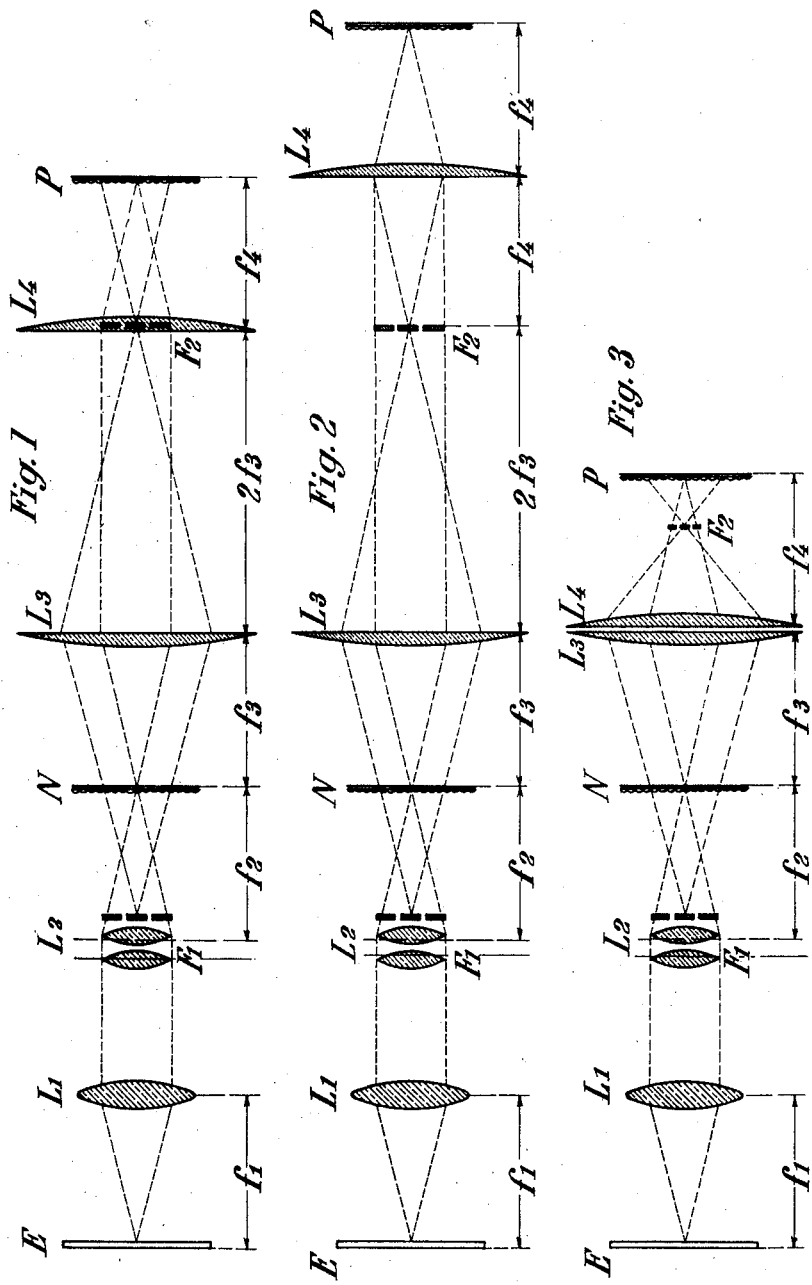

June 27, 1933. G. HEYMER 1,915,418
PROCESS FOR PRINTING COPIES FROM A LENTICULAR FILM
Filed April 22, 1930 2 Sheets-Sheet 2

Inventor:
Gerd Heymer,
by Philip S. Hopkins,
Attorney.

Patented June 27, 1933

1,915,418

UNITED STATES PATENT OFFICE

GERD HEYMER, OF DESSAU-ZIEBIGK IN ANHALT, GERMANY, ASSIGNOR TO AGFA ANSCO CORPORATION, OF BINGHAMTON, NEW YORK, A CORPORATION OF NEW YORK

PROCESS FOR PRINTING COPIES FROM A LENTICULAR FILM

Application filed April 22, 1930, Serial No. 446,323, and in Germany May 8, 1929.

My present invention relates to color photography and more particularly to a process and an optical device useful in printing from a photographic film provided on its rear side with a suitable refractive surface, for example, one covered with minute semicylindrical protuberances of microscopical proportions acting as a true objective, onto a film of the same kind to obtain thereon a non-inversed picture, that is to say, a picture in which the right and left sides correspond to the right and left sides of that of the master film respectively.

According to my invention a lenticular film can be printed on to another lenticular film while illuminating the negative film through the embossing of microscopic refracting elements in such a manner that in the images produced the colors are the actual colors and the right and left sides are not inversed by adopting an optical system which contains in front of the positive film a conjugate plane of the plane in which, when the negative was exposed, the color screen was placed in a size and distance corresponding in each single case to those of the enlargement desired.

In order to render more clear the principle of my invention, arrangements of lenses will now be described, it being understood, however, that the effects produced by the embossing of the negative film have not yet been taken into account for the sake of clarity, reference being made to the accompanying drawings in which Figures 1, 2 and 3 show diagrammatically the way of the light rays maintained during my new printing method. Figures 4 to 7 show different diaphragms which may be inserted into the beam of printing light.

Fig. 1 shows a luminous plane E which is arranged in the focus of a condenser $L_1$ of the focal length $f_1$. The rays emanating from plane E which, for instance, may be an illuminated disc of opaque glass, travel parallel to one another to the objective $L_2$ of the focal length $f_2$ being equal in function to the objective by means of which the negative film was originally exposed. (The term "equal in function" as applied to optical systems is to be understood herein in the same sense as in my copending application Serial Number 450,238, filed May 6, 1930.) Each point of E will, therefore, appear in the focal plane of the objective $L_2$ in which the negative film N is placed, that is to say, in a plane conjugate to the plane in which the illuminated disk E is placed. At a distance of twice the focal length from the objective $L_2$ is arranged the lens $L_3$, the focal length of which is identical with that of the objective $L_2$. Hence, the negative film N is placed in the focal plane both of the objective $L_2$ and of the lens $L_3$. On the other side of the lens $L_3$ at a distance of double the focal length of the lens $L_2$ a further lens $L_4$, is placed which has the same focal length as the lens $L_3$ and the objective $L_2$. On the other side of the lens $L_4$ in its focal plane, with the lenticular support facing the lens, the positive film P is arranged upon which the print is to be produced. In consequence of this arrangement the rays emanating from a point of the negative film N are directed by the lens $L_3$ so as to run parallel and the plane $F_1$ in the objective $L_2$, equal in function to the objective adopted for originally exposing the negative film and corresponding with the screen plane of that objective, is reproduced in $F_2$ constituting the plane of the diaphragm of the projection lens.

As will be seen from the course of beams indicated all rays arrive at the positive film under exactly the same conditions under which the rays emanating from the object were received by the negative film taking the picture. Particularly, the plane of the diaphragm $F_2$ of the projection lens $L_4$ appears when viewed from the postive film in the same manner as the screen plane $F_1$ when viewed from the negative film when the latter was exposed. Since for each point of the plane of the diaphgram $F_2$ of the projection lense $L_4$ the lens elements of the positive film will project the same image as that projected by the lens elements of the negative film N for the corresponding point of the plane $F_1$ of the projection lens $L_2$, there will be formed behind the single lens elements of the positive film P blackenings which exactly correspond to the blackenings to be found behind the respective lens elements of the negative film N. Since the formation of the blackenings depends on the geometrical-optical relations and not at all on the presence of a color screen in front of the negative film, such a color screen can be dispensed with in the arrangement of the projecting device according to my invention and the original can be printed on to a lenticular film provided with an ordinary or an orthochromatically sensitized emulsion layer by exposing it to white light.

Figure 6:
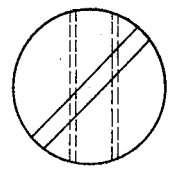
Figure 5:
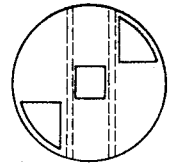
Figure 7:
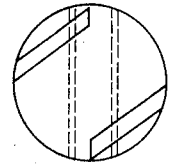

In the preceding description, the fact that the lens elements of the negative film change the course of the rays has been neglected. The net-work of the said film acts as an optical grid and gives rise to the formation of a number of lateral diffraction spectra of each point of the filter plane; thus interfering with the formation of a color-true print, which depends on the projection of each point without any overlapping. The number of these interference images will be the smaller the longer the focal length of the lens elements, the number of lens elements per unit of length remaining the same. In these cases the indistinctness of the image caused by the interference images is rather small so that the prints are still almost true in colors. When, however, the interfence images extend further over the plane of the diaphragm of the projection lens vertically with respect to the longitudinal uses of the cylindrical microscopic lens elements, this disadvantage will be obviated by placing in the plane which the color screen of the condenser occupied in picture-taking, or in the corresponding or conjugate plane in front of the positive film or at both places simultaneously, a diaphragm which serves to retain only the central portion of the projecting beam eliminating thereby all the lateral diffraction spectra and consequently avoiding mixing of the color areas with one another. For this purpose, diaphragms can be used the openings of which correspond with the central parts of the color areas of the three-color screen used in picture-taking. A diaphragm of the kind described has been illustrated in Fig. 4. If desired, the diaphragm placed at $F_2$ may be replaced by a color screen acting in the same manner as the color screen placed at $F_1$; in this case, however, the process is limited to the application of a panchromatically sensitized positive film, so that this arrangement which also reduces the light intensity in printing is not advisable. The best arrangement to positively avoid any overlapping of the interference pictures of one zone with that of another zone of a color stripe is the following: In the plane of the diaphragm $F_1$ of the projection lens $L_2$ a diaphragm is arranged which masks a part of each color area corresponding with the stripes of the color screen in such a manner that any line drawn on the diaphragm perpendicularly to the direction of the stripes, intersects only one unmasked color area. In the plane of the real projected picture of this diaphragm another diaphragm is placed the size of which substantially corresponds to the degree of enlargement to be produced. Thus, if the picture is to be enlarged or reduced $n$ times in copying, the second diaphragm and the projected image of the color screen must be $n$ times greater or smaller than when the picture is to be copied without enlargement or reduction. Preferably, a stepped diaphragm as shown in Fig. 5 is adopted for this purpose. Other still simpler forms of diaphragm producing the same effect are illustrated in Figs. 6 and 7. These diaphragms have slot-like openings at an acute angle to the longitudinal direction of the cylindrical lenses of the negative film and the breadth of which is determined so that the interference images projected by them owing to the lenticular embossing will not cover each other and that the slot placed in the plane of the real image projected in front of the positive film allows to pass only the undeflected image emanating from the slot in front of the negative film. By this arrangement it becomes possible to suppress with certainty the streakiness frequently encountered with the printing methods hitherto used.

Under these conditions pictures are obtained in which the color filter in projection or its virtual image has the same size and the same distance from the film as the color filter in the orginal exposure.

Projection lenses generally have a greater focal length than exposure lenses and therefore it is impossible to produce a projection in true colors in an ordinary projection apparatus of great focal length from a lenticular film which has been exposed by means of a lens of short focal length, since the position of the plane in which, for true color reproduction, a filter must be placed or an image of the filter projected is only adapted for lenses of short focal length.

According to another embodiment of my invention, from a lenticular screen negative which was exposed by means of an ordinary lens of short focal length there may be printed positives suitable for true color projection with lenses of greater focal lengths. For this purpose the method described above is modified in that the objective which according to this method is placed in the plane of the image of the filter for projecting onto the positive film an image of the negative to be copied, is displaced from that plane so as to produce a real or a virtual image of the filter in a predetermined, desired position in relation to the positive different from the position of the filter in relation to the negative in the original exposure plane of the virtual filter image has another position in relation to the positive than it had in relation to the negative. If it is desired to print a positive film suitable for true color projection with any of the usual projection systems the aforesaid objective is placed in such a position that there is produced a virtual image of the filter situated at infinity. A positive film of this type can be projected with lenses of every focal length when the color filter is placed in the front focal plane of the lens.

The plane of the virtual image of the screen can be displaced in a simple manner by printing with an optical system comprising two separate parts, each part being movable independently of the other, in which system the part facing the positive film and constituting the objective herein before referred to (hereinafter called the second part) may be situated at any point between the other (first) part and a plane situated at a distance from the plane of the image of the filter projected by the first part, measured in the direction of the positive film equal to the focal length of the second part but does not occupy the plane of the image of the filter projected by the first part.

The negative film N is fitted in the plane of the focus of the lens or lens combination $L_3$, so that all rays appertaining to any point of the film are directed by the lens $L_3$ to run parallel. Now, when displacing the lens $L_4$ from the plane $F_2$ in the direction of the positive or negative film the image projected by the negative film N will take part in the movement of the lens $L_4$ without changing its size and its postion in the plane of the focus of the lens $L_4$. The postive film P must in each case be brought into the plane of the image produced by the lens $L_4$. When viewed from the positive film the filter image $F_2$ is seen always under the same angle, that is to say, the angle formed by the rays extending to the edges of the filter image. The virtual image of the filter is, however, when viewed from the postive film, more and more displaced from $F_2$ in the direction of $L_3$ and the negative film N, the more the focus of the lens $L_4$ approaches the plane $F_2$. As soon as the focus of the lens $L_4$ coincides with the plane $F_2$ the virtual image of $F_2$ is, when viewed from the positive film, at infinity (Fig. 2). A displacement of $L_4$ in the direction of $L_3$ brings, however, the filter image nearer to the positive film, and also in this case the angle remains the same (Fig. 3).

Hence it follows that by a simple displacement of the part of the optical system $L_4$ facing the positive film from the position which it occupies in Fig. 2 towards the plane $F_2$ positive films can be prepared with various positions of the image of the filter. Thus, according to my invention suitable positive films can be printed for every projection system. It is preferred to adjust the printing lens system in such a manner that the virtual image of the filter image lies at infinity. In this manner, positive films are obtained which can be projected by means of various different projection systems by adapting for projection the color filter in the front focus plane of the projecting objective.

According to the aforesaid embodiments of my invention, a luminous plane E is arranged in the focus of the condenser $L_1$ to illuminate the picture from which a copy is to be printed, whereat diaphragms may be placed in the way of the light rays in order to avoid interference images as mentioned above. The said diaphragms, generally, have slot-like openings at an acute angle to the longitudinal direction of the cylindrical lens elements of the negative film. The optical arrangement described may be smplified by the use of an illuminating device the illuminating plane of which corresponds to that which is not screened off from the whole illuminating surface E by the said diaphragm. For this purpose, the illuminating plane E is substituted by an incandescent lamp which is positioned in an acute angle to the longitudinal direction of the cylindrical lenses of the film from which is to be printed. The breadth of the incandescent filament is thus fixed that no overlapping interference images are projected.

What I claim is:—

1. A process of printing without lateral inversion a lenticular negative film onto another lenticular film destined for the positive picture which comprises illuminating the negative film through the refracting surface and projecting in front of the positive film an image of the plane corresponding to that which in the original exposure contained the multi-color filter or the virtual image thereof at the same distance from the film as shall have the multi-color filter in projecting the printed film, while simultaneously projecting the negative film onto the positive film.

2. A process of printing without lateral inversion a lenticular negative film onto another lenticular film destined for the positive picture which comprises illuminating the negative film through the refracting surface through an objective equal in function to that by means of which the film was taken, and projecting in front of the positive film an image of the plane corresponding to that which in the original exposure contained the multi-color filter or the virtual image thereof at the same distance from the film as shall have the multi-color filter in projecting the printed film, while simultaneously projecting the negative film onto the positive film.

3. A process of printing without lateral inversion a lenticular negative film onto another lenticular film destined for the positive picture which comprises illuminating the negative film through the refracting surface through an objective equal in function to that by means of which the film was taken, inserting in the plane corresponding to that which in the original exposure contained the multi-color filter or its virtual image a diaphragm adapted to avoid mixing of the interference images and projecting in front of the positive film an image of said diaphragm at a distance from the positive film as shall have the multi-color filter in projecting the printed film, while simultaneously projecting the negative film onto the positive film.

4. A process of printing without lateral inversion a lenticular negative film onto another lenticular film destined for the positive picture which comprises illuminating the negative film through the refracting surface through an objective equal in function to that by means of which the film was taken, inserting in the plane corresponding to that which in the original exposure contained the multi-color filter or its virtual image, a first diaphragm a part of each area thereof corresponding with the stripes of the multi-color filter in such a manner that any line drawn on said first diaphragm perpendicularly to the direction of the stripes intersects only one unmasked color area, projecting in front of the positive film an image of said first diaphragm at a distance from the positive film as shall have the multi-color filter in projecting the printed film, while simultaneously projecting the negative film onto the positive film and placing in the plane of said image of said first diaphragm a further diaphragm the size of which is determined by the size of the real image of said first diaphragm.

5. A process of printing without lateral inversion a lenticular negative film onto another lenticular film destined for the positive picture which comprises illuminating the negative film through the refracting surface through an objective equal in function to that by means of which the film was taken, inserting in the plane corresponding to that which in the original exposure contained the multi-color filter or its virtual image, a first diaphragm a part of each area thereof corresponding with the stripes of the multi-color filter in such a manner that any line drawn on said first diaphragm perpendicularly to the direction of the stripes intersects only one unmasked color area, projecting in front of the positive film an image of said first diaphragm at the same distance from the positive film as has the multi-color filter in taking the negative film, while simultaneously projecting the negative film onto the positive film and placing in the plane of said image of said first diaphragm a further diaphragm the size of which is determined by the size of the real image of said first diaphragm.

6. A process of printing without lateral inversion a lenticular negative film onto another lenticular film destined for the positive picture which comprises illuminating the negative film through the refracting surface through an objective equal in function to that by means of which the film was taken, inserting in the plane corresponding to that which in the original exposure contained the multi-color filter or its virtual image, a first diaphragm a part of each area thereof corresponding with the stripes of the multi-color filter in such a manner that any line drawn on said first diaphragm perpendicularly to the direction of the stripes intersects only one unmasked color area, projecting in front of the positive film an image of said first diaphragm at infinity with regard to the positive film, while simultaneously projecting the negative film onto the positive film and placing in the plane of said image of said first diaphragm a further diaphragm the size of which is determined by the size of the real image of said first diaphragm.

7. A process of printing without lateral inversion a lenticular negative film onto another lenticular film destined for the positive picture which comprises illuminating the negative film through the refracting surface through an objective equal in function to that by means of which the film was taken, inserting in the plane corresponding to that which in the original exposure contained the multi-color filter or its virtual image, a first diaphragm a part of each area thereof corresponding with the stripes of the multi-color filter in such a manner that any line drawn on said first diaphragm perpendicularly to the direction of the stripes intersects only one unmasked color area, projecting in front of the positive film an image of said first diaphragm at a distance from the positive film less than that of the multi-color filter from the negative film in taking the same, while simultaneously projecting the negative film onto the positive film and placing in the plane of said image of said first diaphragm a further diaphragm the size of which is determined by the size of the real image of said first diaphragm.

8. An apparatus for printing without lateral inversion a lenticular negative film onto another lenticular film destined for the positive picture which comprises in operative combination an objective, a source of light arranged in front of said objective, a negative film arranged behind said objective with the refracting elements facing said objective, in a plane conjugate to that in which said source of light is arranged, a multi-color filter arranged in front of the negative film in the same optical relation to said negative film as was arranged the multi-color filter in taking the negative film, a lenticular positive film arranged at a substantial distance from said negative film and an optical system inserted between said negative and said positive film and adapted to project an image of said multi-color filter at a distance from the positive film as shall have the multi-color filter in projecting the printed film while simultaneously projecting the negative film onto the positive film.

9. An apparatus for printing without lateral inversion a lenticular negative film onto another lenticular film destined for the positive picture which comprises in operative combination an objective equal in function to that used in taking the negative film, a second objective arranged before said first objective, a source of light arranged in the front focal plane of said second objective, a negative film arranged behind said first objective with the refracting elements facing said first objective, at focal distance of said first objective, a multi-color filter arranged in front of the negative film in the same optical relation to said negative film as was arranged the multi-color filter in taking the negative film, a lenticular positive film arranged at a substantial distance from the negative film and an optical system comprising two parts, the first part being arranged at focal distance from the negative film and being adapted to project an image of the multi-color filter in front of the positive film, the second part being arranged between the first part and the positive film and adapted to project the negative film onto the positive film.

10. An apparatus for printing without lateral inversion a lenticular negative film onto another lenticular film destined for the positive picture which comprises in operative combination an objective equal in function to that used in taking the negative film, a second objective arranged before said first obective, a source of light arranged in the front focal plane of said second objective, a negative film arranged behind said first objective with the refracting elements facing said first objective, at focal distance of said first objective, a diaphragm arranged in front of the negative film in the same optical relation to said negative film as was arranged the multi-color filter in taking the negative film, a lenticular positive film arranged at a substantial distance from the negative film and an optical system comprising two parts, the first part being arranged at focal distance from the negative film and being adapted to project an image of the diaphragm in front of the positive film, the second part being arranged between the first part and the positive film and adapted to project the negative film onto the positive film.

11. An apparatus for printing without lateral inversion a lenticular negative film onto another lenticular film destined for the positive picture which comprises in operative combination an objective equal in function to that used in taking the negative film, a second objective arranged before said first objective, a source of light arranged in the front focal plane of said second objective, a negative film arranged behind said first objective with the refracting elements facing said first objective, at focal distance of said first objective, a diaphragm arranged in front of the negative film in the same optical relation to said negative film as was arranged the multi-color filter in taking the negative film, a lenticular positive film arranged at a substantial distance from the negative film and an optical system comprising two parts, the first part being arranged at focal distance from the negative film and being adapted to project an image of the diaphragm in front of the positive film, the second part being arranged in the plane of said image of said diaphragm and adapted to project the negative film onto the positive film.

12. An apparatus for printing without lateral inversion a lenticular negative film onto another lenticular film destined for the positive picture which comprises in operative combination an objective equal in function to that used in taking the negative film, a second objective arranged before said first objective, a source of light arranged in the front focal plane of said second objective, a negative film arranged behind said first objective with the refracting elements facing said first objective at focal distance of said first objective, a diaphragm arranged in front of the negative film in the same optical relation to said negative film, as was arranged the multi-color filter in taking the negative film, a lenticular positive film arranged at a substantial distance from the negative film and an optical system comprising two parts, the first part being arranged at focal distanct from the negative film and being adapted to project an image of the diaphragm in front of the positive film, the second part being arranged between said image of said diaphragm and the positive film and adapted to project the negative film onto the positive film.

13. An apparatus for printing without lateral inversion a lenticular negative film onto another lenticular film destined for the positive picture which comprises in operative combination an objective equal in function to that used in taking the negative film, a second objective arranged before said first objective, a source of light arranged in the front focal plane of said second objective, a negative film arranged behind said first objective with the refracting elements facing said first objective at focal distance of said first objective, a diaphragm arranged in front of the negative film in the same optical relation to said negative film as was arranged the multi-color filter in taking the negative film, a lenticular positive film arranged at a substantial distance from the negative film and an optical system comprising two parts, the first part being arranged at focal distance from the negative film and being adapted to project an image of the diaphragm in front of the positive film, the second part being arranged between the first part and said image of said diaphragm and adapted to project the negative film onto the positive film.

14. An apparatus for printing without lateral inversion a lenticular negative film onto another lenticular film destined for the positive picture which comprises in operative combination an objective equal in function to that used in taking the negative film, a second objective arranged before said first objective, a source of light arranged in the front focal plane of said second objective, a negative film arranged behind said first objective with the refracting elements facing said first objective at focal distance of said first objective, a diaphragm arranged in front of the negative film in the same optical relation to said negative film as was arranged the multi-color filter in taking the negative film, a lenticular positive film arranged at a substantial distance from the negative film and an optical system comprising two parts, the first part being arranged at focal distance from the negative film and being adapted to project an image of the first diaphragm in front of the positive film, the second part being arranged between said image of said first diaphragm and the positive film and adapted to project the negative film onto the positive film, and a second diaphragm arranged in the plane of said image of said first diaphragm and corresponding in size to said first diaphragm.

15. An apparatus for printing without lateral inversion a lenticular negative film onto another lenticular film destined for the positive picture which comprises in operative combination an objective equal in function to that used in taking the negative film, a second objective arranged before said first objective, a source of light arranged in the front focal plane of said second objective, a negative film arranged behind said first objective with the refracting elements facing said first objective at focal distance of said first objective, a diaphragm arranged in front of the negative film in the same optical relation to said negative film as was arranged the multi-color filter in taking the negative film, a lenticular positive film arranged at a substantial distance from the negative film and an optical system comprising two parts, the first part being arranged at focal distance from the negative film and being adapted to project an image of the first diaphragm in front of the positive film, the second part being arranged between the first part and said image of said first diaphragm and adapted to project the negative film onto the positive film, and a second diaphragm arranged in the plane of said image of said first diaphragm and corresponding in size to said first diaphragm.

In testimony whereof, I affix my signature.

GERD HEYMER.